(12) United States Patent
Altobelli et al.

(10) Patent No.: US 10,671,138 B2
(45) Date of Patent: Jun. 2, 2020

(54) PARALLEL BACKUP POWER SUPPLY

(71) Applicant: HEWLETT PACKARD ENTERPRISE DEVELOPMENT LP, Houston, TX (US)

(72) Inventors: David K. Altobelli, Houston, TX (US); Justin H. Park, Houston, TX (US); Patrick A. Raymond, Houston, TX (US); Han Wang, Houston, TX (US); Raghavan V. Venugopal, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 199 days.

(21) Appl. No.: 15/518,211

(22) PCT Filed: Oct. 30, 2014

(86) PCT No.: PCT/US2014/063175
§ 371 (c)(1),
(2) Date: Apr. 10, 2017

(87) PCT Pub. No.: WO2016/068943
PCT Pub. Date: May 6, 2016

(65) Prior Publication Data
US 2017/0308142 A1    Oct. 26, 2017

(51) Int. Cl.
*G06F 1/30* (2006.01)
*G06F 1/26* (2006.01)
(Continued)

(52) U.S. Cl.
CPC .............. *G06F 1/30* (2013.01); *G06F 1/263* (2013.01); *G06F 1/28* (2013.01); *H02J 7/0022* (2013.01); *H02J 9/061* (2013.01)

(58) Field of Classification Search
CPC .... G06F 1/30; G06F 1/263; G06F 1/28; H02J 7/0022; H02J 9/061
See application file for complete search history.

(56) References Cited

U.S. PATENT DOCUMENTS 3,928,791 A * 12/1975 Mullersman .......... H02J 7/0026
                                                              320/119
6,586,909 B1    7/2003 Trepka
(Continued)

OTHER PUBLICATIONS

International Search Report & Written Opinion received in PCT Application No. PCT/US2014/063175, dated Jun. 16, 2015, 12 pages.

(Continued)

*Primary Examiner* — Jaweed A Abbaszadeh
*Assistant Examiner* — Gayathri Sampath
(74) *Attorney, Agent, or Firm* — Brooks, Cameron & Huebsch, PLLC

(57) ABSTRACT

Example implementations relate to a parallel backup power supply. For example, a parallel backup power supply system can include a plurality of backup power supply cells that support a plurality of loads. Each of the backup power supply cells can include a charging module to charge an associated backup power supply cell among the plurality of backup power supply cells and a cell controller. The cell controller is to can be configured to control the charging module and communicate with a management module. The parallel backup power supply system can also include the management module to activate each of the plurality of backup power supply cells to provide backup power in parallel to the plurality of loads as each of the plurality of backup power supply cells is fully charged.

18 Claims, 3 Drawing Sheets

(51) Int. Cl.
*H02J 7/00* (2006.01)
*H02J 9/00* (2006.01)
*G06F 1/28* (2006.01)
*H02J 9/06* (2006.01)

(56) References Cited

U.S. PATENT DOCUMENTS

| | | | | |
|---|---|---|---|---|
| 7,498,770 | B1* | 3/2009 | Caldwell, II | H02J 7/0013 320/111 |
| 2001/0015634 | A1* | 8/2001 | Shirakawa | H02J 7/0013 320/110 |
| 2002/0053895 | A1* | 5/2002 | Simoes | H02J 7/0034 320/114 |
| 2005/0275372 | A1 | 12/2005 | Crowell | |
| 2008/0265836 | A1* | 10/2008 | Inoue | H02J 7/0003 320/110 |
| 2009/0208824 | A1* | 8/2009 | Greening | G06F 1/189 429/91 |
| 2009/0295330 | A1 | 12/2009 | Li et al. | |
| 2010/0295513 | A1 | 11/2010 | McCollum et al. | |
| 2010/0299548 | A1* | 11/2010 | Chadirchi | G06F 1/263 713/340 |
| 2011/0072280 | A1 | 3/2011 | Chiasson et al. | |
| 2011/0279085 | A1 | 11/2011 | Shigemizu et al. | |
| 2012/0112703 | A1* | 5/2012 | Xu | H02J 7/0022 320/145 |
| 2013/0227310 | A1 | 8/2013 | Jau et al. | |
| 2014/0035513 | A1* | 2/2014 | Kroenke | H02J 7/0021 320/107 |
| 2014/0070760 | A1 | 3/2014 | Albsmeier et al. | |
| 2014/0077754 | A1* | 3/2014 | Carmichael | H02J 7/0073 320/107 |
| 2014/0091751 | A1* | 4/2014 | Workman | H02J 7/0013 320/106 |
| 2014/0175869 | A1 | 6/2014 | Phillips et al. | |

OTHER PUBLICATIONS

Texas Instruments, "PowerLAN™ Master Gateway Battery Management Controller With PowerPump™ Cell Balancing Technology," (Research Paper), Apr. 2009, 32 pages.

* cited by examiner

PARALLEL BACKUP POWER SUPPLY

BACKGROUND

As reliance on computing systems continues to grow, so too does the demand for reliable power systems and back-up schemes for these computing systems. Servers, for example, may provide architectures for backing up data to flash or persistent memory as well as back-up power sources for powering this back-up of data after the loss of power. Backup power supplies may sometimes include energy components such as capacitors or batteries.

DETAILED DESCRIPTION

Figure 1:
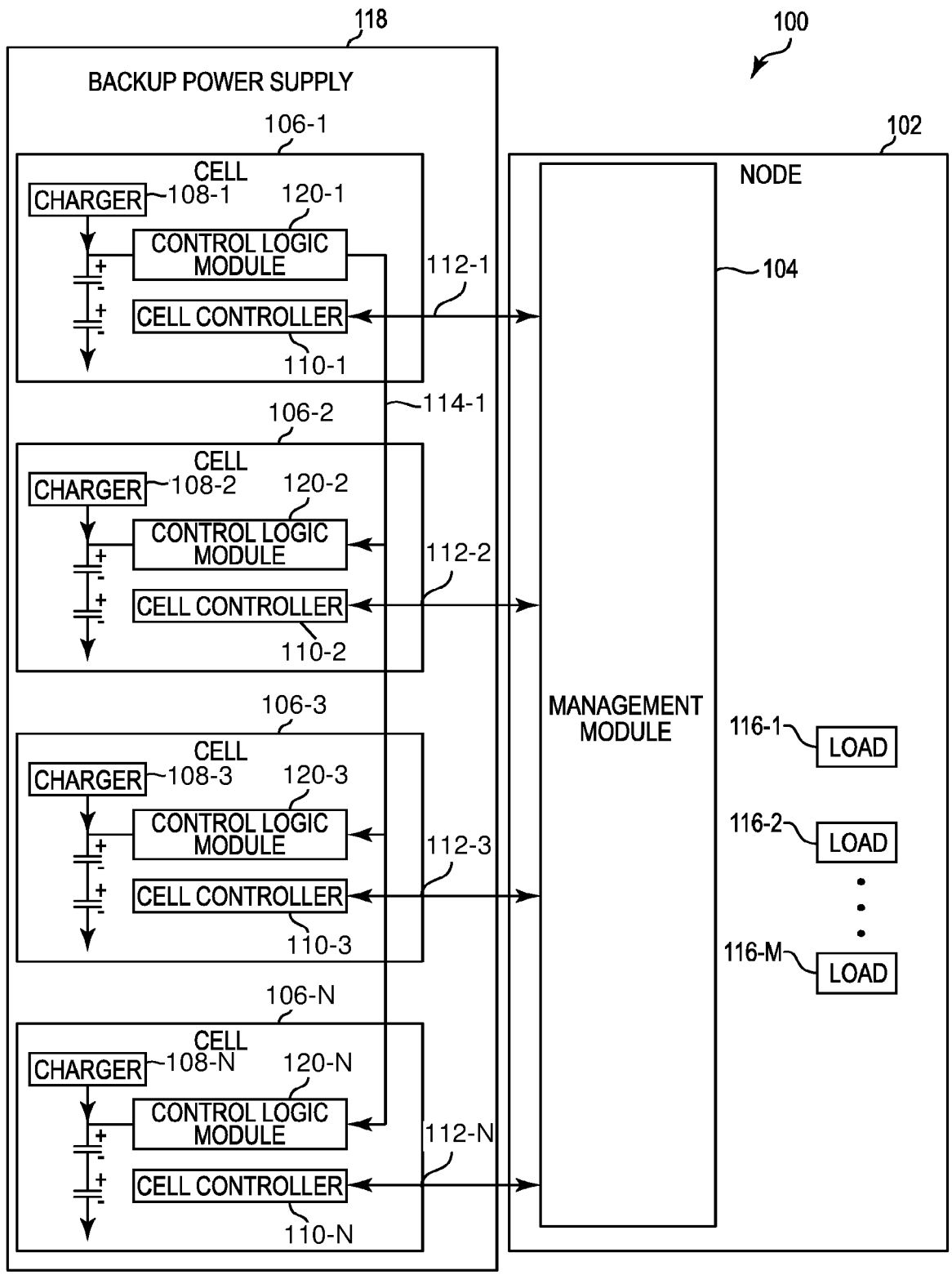
FIG. 1 illustrates a block diagram of an example of a parallel backup power supply system according to the present disclosure.

A computing data storage system can include a number of nodes that support a number of loads. The nodes can be a number of servers, for example. A number of loads can include storage controllers or devices associated with the servers. For example, a load can include cache memory, dual inline memory modules (DIMMs), Non-Volatile Dual In-Line Memory Modules (NVDIMMs), and/or array control logic, among other storage controllers and/or devices associated with the servers. A computing data storage system can include a parallel backup power supply system operatively coupled to the number of nodes to support the number of loads in an event of a removal of a primary power supply.

A removal of a primary power supply can be scheduled or un-scheduled. For instance, a scheduled removal of the primary power supply can be the result of scheduled maintenance on the number of nodes and/or the number of loads. A scheduled removal of the primary power supply can be an intentional power down of the number of nodes and/or the number of loads to add and/or remove nodes to a chassis and/or network connected to a primary power supply. In another example, a scheduled removal of the primary power supply can be an intentional power down to add and/or remove one or more loads to or from one or more nodes.

An un-scheduled primary power supply removal can be a failure in the primary power supply. An un-scheduled primary power supply removal can occur when, for example, the primary power supply fails momentarily and/or for an extended period of time.

It may be desirable to move data from cache memory in the number of nodes to non-volatile memory upon the removal of a primary power supply. However, moving data from cache memory to non-volatile memory can involve a power supply. A backup power supply can be a secondary power supply including a backup power supply cell that is used to provide power for moving data from cache memory to non-volatile memory when the primary power is removed.

Providing backup power for moving data from cache memory to non-volatile memory may include providing each node with a separate, shared backup power supply, rather than providing a backup power supply for each load within a node. That is, a single node containing a number of loads can be connected to a single shared backup power supply including a cell. However, using a cell to provide backup power to a node hosting a number of loads can have a number of disadvantages. For example, a cell can be limited in the output (e.g., backup power) it can provide and as such the node can be limited in the number loads it can host.

In accordance with examples of the present disclosure a backup power supply can include a number of cells coupled in parallel. Providing backup power via cells coupled in parallel can increase the quantity of loads that are supported by the cells as compared to providing backup power via a single cell. Each backup power supply cell can include a charging module to charge an associated backup power supply cell. Each backup power supply cell can also include a cell controller to control the charging module and to communicate with a management module. The parallel backup power supply system can also include the management module configured to activate each of the plurality of backup power supply cells in parallel as each of the plurality of backup power supply cells becomes fully charged.

Providing backup power via cells coupled in parallel can also provide flexibility in adding and/or removing loads from the backup power system by adding and/or removing cells from the cells coupled in parallel without disrupting power services provided to the remaining loads.

FIG. 1 illustrates a block diagram of an example of a parallel backup power supply system 100 according to the present disclosure. As illustrated in FIG. 1, the system 100 includes a node 102, a backup power supply 118, and a plurality of cells 106-1, 106-2, 106-3, . . . , and 106-N (e.g., herein generally referred to as cells 106).

A node 102, as described herein, is a device that supports a plurality of loads 116-1, 116-2, . . . , load 116-M (e.g., herein generally referred to as loads 116). The node 102 can be a physical device and/or a virtual device. The node 102 can include a number of devices, such as local memory or data storage (e.g., referred generally as memory). The memory may contain volatile and non-volatile memory, e.g., cache and non-volatile memory dual inline memory modules (NVIDIMM). Thus, each memory in the node 102 can contain a number of NVDIMM slots. Each NVDIMM slot among the number of NVDIMM slots can provide a load (e.g., loads 116).

Node 102 can include other devices such as cache memory, DIMMs, array control logic, and storage controllers, among other devices associated with the node 102, and each of the devices associated with the node 102 can provide a load. For instance, load 116-2 can be provided by a storage controller, whereas each NVDIMM slot among the number of NVDIMM slots can provide load 116-1. In some examples, the node 102 can also include a control logic unit (not illustrated in FIG. 1). The loads 116 can be a number of storage controllers and/or a number of storage devices such as NVDIMMs. The node 102 can also include a management module 104.

The management module 104 can be hardware and/or computer executable instructions (e.g., software). For example, the management module 104 can be system firmware that activates communication between the node 102 and the cells 106 that form a backup power supply 118. Examples of system firmware can include Basic Input/Output System (BIOS) and/or a Baseboard Management Controller (BMC) unit. BIOS provides initialization and testing of the hardware components of the node 102 and loads an operating system for the node 102 when it is powered on. The BMC unit can be a specialized microcontroller embedded on the motherboard of the node 102. The BMC can manage the interface between system management software and platform hardware. While examples herein use BIOS and a BMC unit as examples of system firmware, examples of the present disclosure are not so limited. Other types of system firmware can be used to perform the various examples described in this disclosure. Furthermore, while specific examples are outlined herein, describing actions performed by BIOS and by a BMC unit, examples are not limited. Actions described as being performed by BIOS can be performed by a BMC unit and/or other types of system firmware. Similarly, actions described as being performed by a BMC unit can be performed by BIOS and/or other types of system firmware.

The management module 104 can communicate with cells 106 via communication paths 112-1, 112-2, 112-3, . . . , 112-N. For example, the management module 104 can communicate with the cell 106-1 via a communication path 112-1, the management module 104 can communicate with the cell 106-2 via a communication path 112-2, the management module 104 can communicate with the cell 106-3 via a communication path 112-3, . . . , and the management module 104 can communicate with the cell 106-N via a communication path 112-N.

The management module 104 can communicate with the cells 106 to provide instructions to the cells 106 regarding a charge mode and/or the activation of the individual cells to provide backup power services to the loads 116, among other instructions. The management module 104 can also communicate with the cells 106 to monitor a charge level of each of the cells 106. As used herein, activating the cells can include activating the output of the individual cells to provide backup power to the loads 116. That is, the cells 106 cannot provide backup power before the cells 106 are activated and can provide backup power after the cells 106 are activated.

The management module 104 can further activate the loads 116. As used herein, activating the loads 116 includes providing primary power to the loads 116 and/or providing instructions to the loads 116 to perform a function. Providing power to the loads 116 can include initiating a power-up sequence on the loads 116 to activate the loads 106. Providing instructions to the loads 116 to perform a function can include providing instructions to the loads 116 after the loads have been powered-up but are not yet performing the function. The function can include services that the loads provide. For example, a function can include storage services, among other possible services. That is, the powered-up loads 116 that are not providing a function can receive instructions to provide the function.

The backup power supply 118 includes the cells 106. As used herein, the cells 106 are devices that provide backup power. For example, a cell can be a battery, among other backup power devices. Each of the cells 106 can include a charger, a cell controller, and control logic module. For example, a cell 106-1 can include a charger 108-1, a cell controller 110-1, and a control logic module 120-1, a cell 106-2 can include a charger 108-2, a cell controller 110-2, and a control logic module 120-2, a cell 106-3 can include a charger 108-3, a cell controller 110-3, and a control logic module 120-3, . . . , and a cell 106-N can include a charger 10-N, a cell controller 110-N, and a control logic module 120-N.

The charger 108-1, charger 108-2, charger 108-3, . . . , charger 108-N are herein referred to generally as chargers 108. The cell controller 110-1, cell controller 110-2, cell controller 110-3, . . . , and cell controller 110-N are herein referred to generally as cell controllers 110. The control logic module 120-1, the cell control logic module 120-2, the cell control logic module 120-3, . . . , and the cell control logic module 120-N are referred to generally as cell control logic modules 120.

Each charger in a cell (e.g., the cells 106) receives power from a primary power source (e.g., not shown) and can provide the power to an associated cell. For example, a charger 108-1 can receive power from a primary source and can provide the power to cell 106-1. The charger 108-1 can provide the power to a power storage unit. Providing power to a power storage unit is referred to herein as charging the cells 106. A charger 108-1 can charge cell 106-1 using a number of charging modes.

A charging mode can be a constant current (CC) mode and/or a constant voltage (CV) mode, among other possible charging modes. As defined herein, a CC mode is defined as providing a relatively uniform current to a cell. In a number of examples, charging a cell in CC mode can result in reaching a target charge faster than charging a cell in CV mode. Accordingly, the CC mode is used to charge the cells 106 if the cells have a charge level that is less than a threshold charge. For example, a CC mode is used to charge any of the cells 106 that have a charge that is less than a 95% charge, although the threshold charge can be any charge selected to indicate a full charge.

As defined herein, a CV mode is defined as providing a relative uniform voltage. The CV mode is used to charge the cells 106 if the cells have a charge that is equal to or greater than a threshold charge. A CV charge can be used to maintain a threshold charge. That is, the CV charge can be used to maintain a floating charge. In a number of examples, a particular charger (e.g., a charger 108-1) can charge a particular cell (e.g., a cell 106-1) using a CV mode or a particular charger (e.g., a charger 108-1) can charge a plurality of cells (e.g., the cells 106) using the CV mode. A single charger (e.g., any of chargers 108) can charge the cells 106 via power path 114.

The cell controllers 110 in the cells 106 communicate with the management module 104 and control the function of cells 106 via the control logic modules 120. Each of the cell controllers 110 are associated with a number of registers that can store information pertaining to associated cells 106. The cell controllers 110 can communicate with the management module 104 via a communication path. For example, cell controller 110-1 communicates with management module 104 via communication path 112-1, cell controller 110-2 communicates with management module 104 via communication path 112-2, cell controller 110-3 communicates with management module 104 via communication path 112-3, . . . , and cell controller 110-N communicates with management module 104 via communication path 112-N.

The cell controllers 110 can determine the charge mode that the chargers 108 implement by storing instructions in the registers that indicate the same. The cell controllers 110 can also receive instructions from the management module 104 on matters pertaining to the cells 106 and can implement the instructions by storing the instructions in the registers. The control logic modules 120 are hardware and/or machine readable instructions that implement the instructions provided by the cell controllers 110 via the registers.

Figure 2:
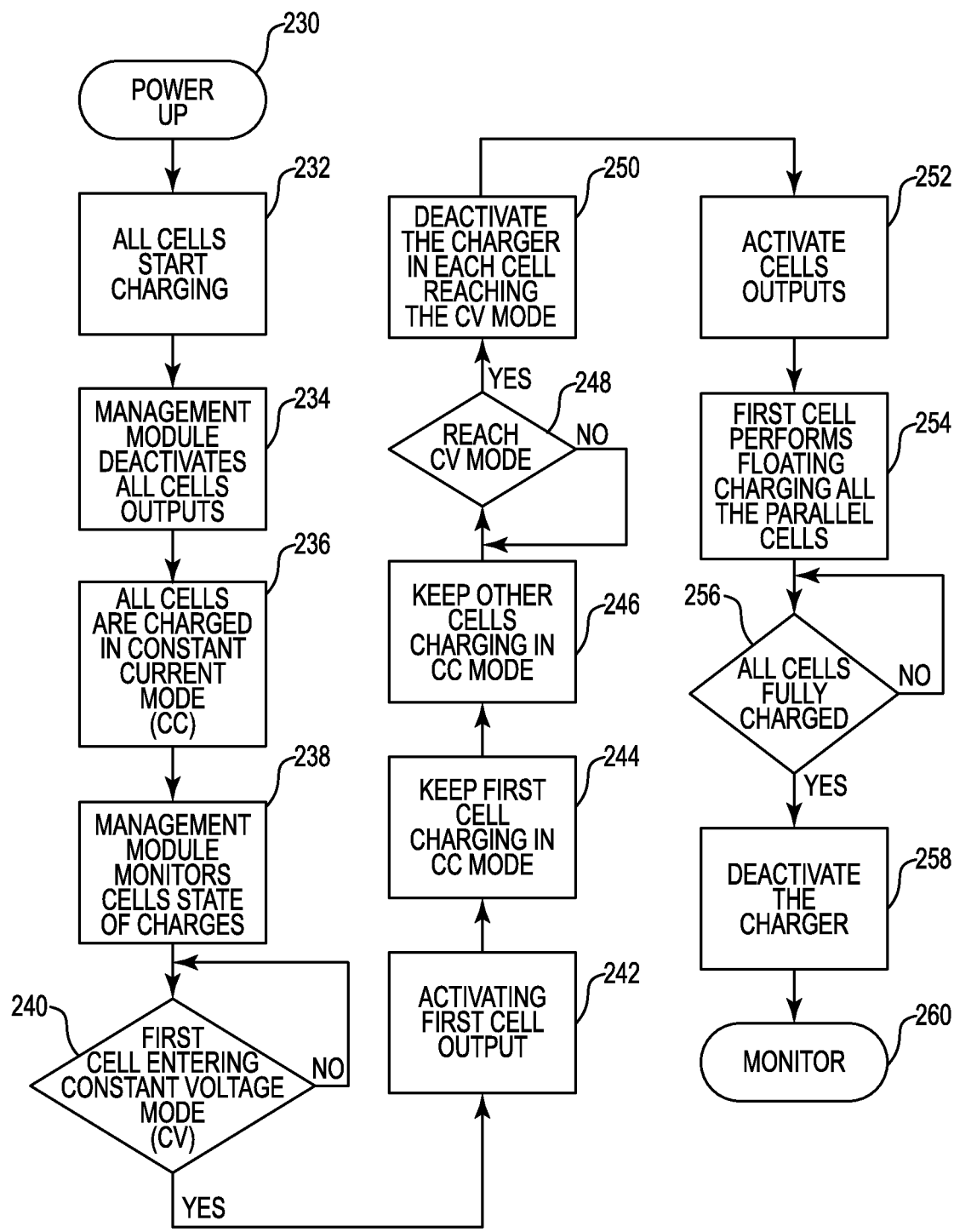
FIG. 2 illustrates a flow diagram of an example method for a parallel backup power supply according to the present disclosure.

FIG. 2 illustrates a flow diagram of an example method for parallel backup power supply according to the present disclosure. At 230, a node and/or a backup power supply can be powered up. Powering up the node 102 and/or the backup power supply can include providing primary power to the backup power supply and/or the node.

At 232, the cells can start charging. The cell controllers can initiate a charging sequence. A charging sequence can be initiated by providing primary power to the cells.

At 234, the management module can deactivate cell outputs. The management module can deactivate cell outputs by providing instruction to the cell controllers to deactivate cell outputs. The management module can deactivate cell outputs by writing to a number of registers that are associated with cell controllers via communication paths. Deactivating the cell outputs can include deactivating each of the cells from power path such that the cells cannot provide backup power to nodes and/or loads.

At 236, the cell controllers can charge the cells in a constant current (CC) mode. The cell controllers 110 can determine which of the cells have a charge that is less than a full charge. For example, each of the cells controllers can determine whether their associated cell from the cells has a charge that is less than a 95% charge. As used herein, an associated cell refers to a cell that has a commonality with another object. For example, a controller is associated with a cell via the fact that the controller is located within the cell. In a number of examples, charge levels other than a 95% charge can also be labeled as a full charge. The cell controllers can charge the cells by instructing the chargers to charge the cells. The cell controllers can provide instructions to the chargers by storing the instructions in associated registers.

At 238, the management module monitors the cell's state of charges. Monitoring the cell's state of charges can include monitoring a charge level and/or a charge mode of each of the cells, as described herein. Monitoring the cell's state of charges can include communicating with the cell controllers via communication paths. Communicating with the cell controllers can include reading a plurality of registers associated with the cell controllers to determine a charge level and/or a charge mode of the cells. In a number of examples, monitoring the cell's state of charges can include requesting a charge level and/or a charge mode from each of the cells and receiving a charge level and/or a charge mode from each of the cells via the cell controllers.

At 240, it can be determined whether a first cell from the cells has entered a constant voltage (CV) mode. Before 240, all of the cells can be charged using a CC mode. After 240, one of the cells (e.g., cell 106-1) can be charged in CV mode while the remaining cells can be charged in CC mode.

A change in charging mode from a CC mode to a CV mode can be made by any of the cell controllers based on the charge level of the given cells. For example, cell controller can monitor the charge level associated with cell and can provide the charger with instructions to change a charge mode from CC mode to CV mode based on whether the cell is fully charged (e.g., 95% charge or greater). The charge mode can be changed from a CC mode to a CV mode to maintain a cell charge level at a particular charge. For example, the CV mode can maintain a cell's charge at a 95% charge.

If it is determined that the first cell has not entered a CV mode, then the flow chart returns to 240. That is, the determination, whether the first cell has entered a CV mode, is continuously made until it is determined that the first cell has entered a CV mode. The flow chart continues to 242 based on a determination that the first cell has entered a CV mode.

At 242, a first cell output is activated. Activating a cell output can include providing backup power services to the loads. The loads that receive backup power services can be proportional to the backup power that can be provided by the first cell.

For example, if a first cell provides 96 watts (W) of backup power, then only a portion of the loads that consume up to up to 96 W of energy in performing data backup services can be activated when the first cell 106-1 is activated. That is, if any one of the loads consumes 24 W of energy in performing data backup services, then four loads can be activated when the first cell is activated. The first cell can be activated by an associated cell controller and/or by the management module. The management module can activate the first cell in response to the first cell being fully charged and/or in response to a charge mode associated with the first cell being changed from a CC mode to a CV mode.

At 244, the first cell is kept in CV mode. That is, the charger that is associated with the first cell continues to charge the first cell in CV mode while the remaining cells are charged in a CC mode 246 by associated chargers, at 246.

At 248, it can be determined whether any of the remaining cells have entered a CV mode. That is, the management module and/or the cell controllers that are associated with the remaining cells can monitor the remaining cells to determine whether any of the associated chargers have changed a charge mode from a CC mode to a CV mode. If none of the remaining cells have entered a CV mode, then the flow chart continues to determine whether any of the remaining cells have entered a CV mode. If at least one of the remaining cells is being charged in a CV mode, then the flow chart continues to 250.

At 250, the chargers in each of the cells that are charged in CV mode are deactivated. Deactivating the chargers that are associated with the remaining cells (e.g., not a charger associated with the first cell) results in remaining cells not being charged by their associated chargers. Rather, deactivating chargers that are associated with the remaining cells allows a charger that is associated with the first cell to charge the remaining cells and the first cell in CV mode as described in 254.

At 252, the output associated with the cells is activated. Activating the cell's output provides backup power to the loads. At 252, only the output of cells that are being charged in CV mode are activated. Activating the output of the cells that are activated can include providing parallel backup power to the loads.

For example, if each cell from the cells provides 96 W of backup power and if there are four cells, then the cells can provide 384 W of paralleled backup power to the loads. Each time one of the cells is activated, a number of loads that consume an associated wattage in backup services are activated. For example, if at 252, a second cell is activated and if the second cell provides 96 W of backup power, then four additional loads can also be activated if each of the four additional loads consumes 24 W of backup power.

At 254, the first cell performs float charging on the cells coupled in parallel. A floating charge is a charge that is constantly replenished such that the charge remains at a relative threshold. For example, if a threshold is a 95% charge, then a cell charge can remain at 95% via a floating charge. The floating charge can be provided in a CV mode by the charger associated with the first cell to the remaining cells due to the deactivation of the chargers associated with the remaining cells.

At 256, it is determined if the cells are fully charged (e.g., charged to a threshold charge of 95% charge or greater). If the cells are fully charged, the flow chart proceeds to 258. If the cells are not fully charged, the flow chart returns to 256.

At 258, the charger is deactivated. Deactivating the charger can include providing the charger with instructions to not charge an associated cell.

At 260, the cells can be monitored. Monitoring the cells can include determining if any of the cells have failed. A cell can fail if the cell does not retain a full charge. For example, if the first cell is being charged by an associated first charger in CV mode and the first charger is not able to maintain a full charge in the first cell, then the first cell can be classified as having failed.

In a number of examples, a failed cell can be deactivated. Deactivating the failed cell can reduce the output of the backup power supply. For example, if the backup power supply can provide 384 W output before a cell fails, then the backup power supply can provide 288 W after a cell fails. Deactivating the failed cell can also include deactivating a portion of the loads that consume the backup power services provided by the failed cell. For example, the portion of the loads can include four loads and can be deactivated based on the deactivation of the failed cell. The deactivated loads can consume backup power services equal to or greater than the backup power provided by the deactivated cell.

In a number of examples, the management module and/or the cell controllers can deactivate the cells. The management module can also deactivate the loads.

Figure 3:
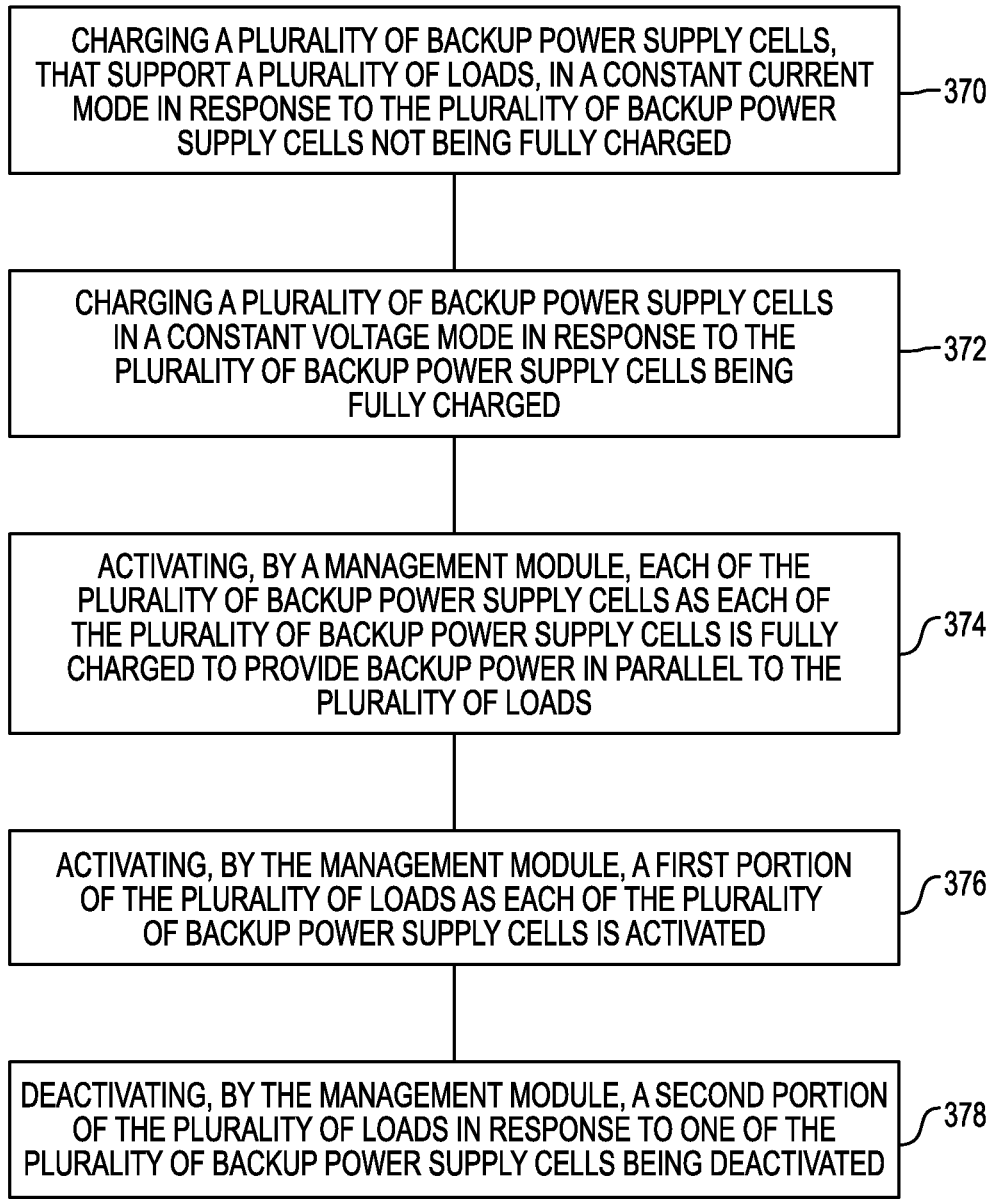
FIG. 3 illustrates a flow diagram of an example method for a parallel backup power supply according to the present disclosure.

FIG. 3 illustrates a flow diagram of an example method for a parallel backup power supply according to the present disclosure. At 370, a plurality of power supply cells that support a plurality of loads are charged in CC mode in response to the plurality of backup power supply cells not being fully charged. The constant current mode may be used to charge a cell that is not fully charged because a cell charged in CC mode can be charged faster than a cell charged in CV mode.

In a number of examples, each of the plurality of backup power supply cells can be deactivated due to the inability of the plurality of backup power supply cells to provide backup power services to a plurality of loads. Deactivating the plurality of backup power supply cells can result in a lack of backup power services even if there is a failure in the primary power source. Deactivation of the plurality of backup power supply cells can occur even if the backup power supply cells were previously activated if the backup power supply cells are not fully charged.

At 372, the plurality of backup power supply cells are charged in CV mode in response to the plurality of backup power supply cells being fully charged. Each of the plurality of backup power supply cells can be associated with a cell controller. Each of the cell controllers can monitor a charge level associated with corresponding cells via a control logic module. The cell controller can instruct a charger to charge a charge mode from a CC mode to a CV mode to provide a floating charge to a cell. In a number of examples, a single charger can charge a plurality of cells in CV mode and/or a plurality of chargers can charge the plurality of cells in CV mode.

At 374, each of the plurality of backup power supply cells are activated by the management module as each of the plurality of backup power supply cells are fully charged to provide backup power in parallel. The activation of the backup power supply cells can include the backup power supply cells being coupled in parallel such that the power output of the parallel backup power supply cells is greater than an individual backup power supply cell. The backup power supply cells that are coupled in parallel can provide backup power services to a greater number of loads than a number of loads than an individual backup power supply cell can support.

In a number of examples, each of the plurality of backup power supply cells are activated as their charge levels become equal to a charge level of a first activated backup power supply cell. Activating the plurality of backup power supply cells can include switching the cells from being charged in a CC mode to being charged in a CV mode. That is, the charge level of a first backup power supply cell to be charged in a constant voltage mode can be a threshold charge that can be used to determine when the remaining cells are charged in a constant voltage mode. In a number of examples, the activated backup power supply cells are stabilized each time a backup power supply cell is activated.

At 376, a portion of the plurality of loads is activated by the management module as each of the plurality of backup power supply cells is activated. The portion that is activated can consume backup power services equal to the backup power services that are provided by the recently activated backup power supply cells. In a number of examples, the backup power supply cells are activated at different times and a number of portions of the plurality of loads are also activated in different times.

For example, a first load can be activated at a different time than any of the other loads due to the activation of a first backup power supply cell. Activating different portion of the plurality of loads as the backup power supply cells become activated can ensure that each activated load can receive backup power services in the case of a primary power supply failure.

At 378, a portion of the plurality of loads is deactivated by the management module in response to one of the plurality of backup power supply cells being deactivated. Deactivating portions of the loads as a backup power supply cells is deactivated can ensure that each activated load can receive backup power services in the case of a primary power supply failure. In a number of examples, each backup power supply cell can be deactivated by an associated cell controller and/or by the management module.

In the present disclosure, reference is made to the accompanying drawings that form a part hereof, and in which is shown by way of illustration how a number of examples of the disclosure may be capable of being practiced. These examples are described in sufficient detail to enable those of ordinary skill in the art to practice the examples of this disclosure, and it is to be understood that other examples may be capable of being used and that process, electrical, and/or structural changes may be capable of being made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples may be capable of being made without departing from the spirit and scope of the system and method of the present disclosure, this specification merely sets forth some of the many possible example configurations and implementations.

What is claimed is:

1. A parallel backup power supply system, comprising:
    a plurality of backup power supply cells that support a plurality of loads, each backup power supply cell including:
        a charger to charge an associated backup power supply cell among the plurality of backup power supply cells; and
        a cell controller to:
            control the charger;
            monitor a charge level of the associated backup power supply cell;
            communicate the charge level of the associated backup power supply cell to a management module; and
            switch the associated backup power supply cell from a constant current charging mode to a constant voltage charging mode; and
    the management module to:
        individually monitor the charge level of each backup power supply cell, from the associated cell controller, to determine whether the backup power supply cell is fully charged;
        activate each of the plurality of backup power supply cells to provide backup power in parallel to the plurality of loads, wherein each backup power supply cell is activated based on the individually monitored charge level indicating that the backup power supply cell is fully charged; and
        once all the backup power supply cells have been switched to the constant voltage charging mode, deactivate the charger of every backup power supply cell except a first backup power supply cell that was switched to the constant voltage charging mode, the charger of the first backup power supply cell then to charge all the backup power supply cells in the constant voltage charging mode.

2. The system of claim 1, comprising a communication path between the plurality of backup power supply cells and the management module.

3. The system of claim 1, the cell controller to:
    activate the charger when the associated backup power supply cells are not fully charged; and
    deactivate the charger when the associated backup power supply cells are fully charged.

4. The system of claim 1, the management to deactivate the plurality of backup power supply cells when the plurality of backup power supply cells are not fully charged.

5. The system of claim 1, the charger to charge the associated backup power supply cell in:
    the constant current charging mode when the associated backup power supply cell is not fully charged; and
    the constant voltage charging mode when the associated backup power supply cell is fully charged.

6. A non-transitory machine readable medium storing instructions executable by a processing resource to cause a computer to:
    charge, by a plurality of chargers, a plurality of backup power supply cells, that support a plurality of loads, in a constant current charging mode in response to the plurality of backup power supply cells not being fully charged;
    charge, by the plurality of chargers, the plurality of backup power supply cells in a constant voltage charging mode in response to the plurality of backup power supply cells being fully charged;
    switch, by a cell controller, at least one of the backup power supply cells from the constant current charging mode to the constant voltage charging mode;
    individually monitor, by a management module, a state of charge of each of the plurality of backup power supply cells to determine whether the backup power supply cell is fully charged;
    activate, by the management module, each of the plurality of backup power supply cells in response to determining that the backup power supply cell is fully charged, to provide backup power in parallel to the plurality of loads;
    activate, by the management module, a portion of the plurality of loads as each of the plurality of backup power supply cells is activated; and
    by the management module, once all the backup power supply cells have been switched to the constant voltage charging mode, deactivate a charger of every backup power supply cell except a first backup power supply cell that was switched to the constant voltage charging mode, a charger of the first backup power supply cell then to charge all the backup power supply cells in the constant voltage charging mode.

7. The medium of claim 6, including instructions to activate the portion of the plurality of loads with a requirement that is proportional to an output of an activated backup power supply cell.

8. The medium of claim 6, including instructions to disable automatic enable on each of the plurality of backup power supply cells.

9. The medium of claim 6, including instructions to enable a first backup power supply cell from the plurality of backup power supply cells when the first backup power supply cell reaches a threshold charge.

10. The medium of claim 9, wherein the threshold charge is a charge greater than or equal to a 95% charge.

11. The medium of claim 9, including instructions to enable additional backup power supply cells from the plurality of backup power supply cells when the additional backup power supply cells have a charge equal to the threshold charge.

12. The medium of claim 6, including instructions to stabilize a plurality of activated backup power supply cells from the plurality of backup power supply cells each time a backup power supply cell is activated.

13. A method of parallel backup power supply, comprising:
    charging a plurality of backup power supply cells, that support a plurality of loads, in a constant current charging mode in response to the plurality of backup power supply cells not being fully charged;
    switching, by a cell controller, the plurality of backup power supply cells from the constant current charging mode to a constant voltage charging mode;

by a management module, once all the backup power supply cells have been switched to the constant voltage charging mode, deactivating a charger of every backup power supply cell except a first backup power supply cell that was switched to the constant voltage charging mode;

Charging, by a charger of the first backup power supply cell, the plurality of backup power supply cells in the constant voltage charging mode in response to the plurality of backup power supply cells being fully charged;

individually monitoring, by a management module, a state of charge of each of the plurality of backup power supply cells to determine whether the backup power supply cell is fully charged;

activating, by the management module, each of the plurality of backup power supply cells in response to determining that the backup power supply cell is fully charged to provide backup power in parallel to the plurality of loads;

activating, by the management module, a first portion of the plurality of loads as each of the plurality of backup power supply cells is activated; and deactivating, by the management module, a second portion of the plurality of loads in response to one of the plurality of backup power supply cells being deactivated.

14. The method of claim 13, including deactivating any of the plurality of backup power supply cells that fail.

15. The method of claim 14, including deactivating the second portion of the plurality of loads that is proportional to a capacity of a disabled backup power supply cell.

16. The system of claim 1, the management module to activate a first backup power supply cell, of the plurality of backup power supply cells, when an individually monitored charge level for the first backup power supply cell indicates that the first backup power supply cell is fully charged.

17. The system of claim 1, the cell controller to communicate the charge level by communicating whether a charging mode for the associated backup power supply cell is the constant current charging mode or the constant voltage charging mode.

18. The system of claim 17, the management module to:

individually monitor the charge level of each backup power supply cell by individually monitoring the charging mode for the backup power supply cell; and activate each backup power supply cell based on the charging mode being the constant voltage charging mode.

* * * * *